(No Model.)
J. M. SKINNER.
FILTER.
No. 508,440. Patented Nov. 14, 1893.
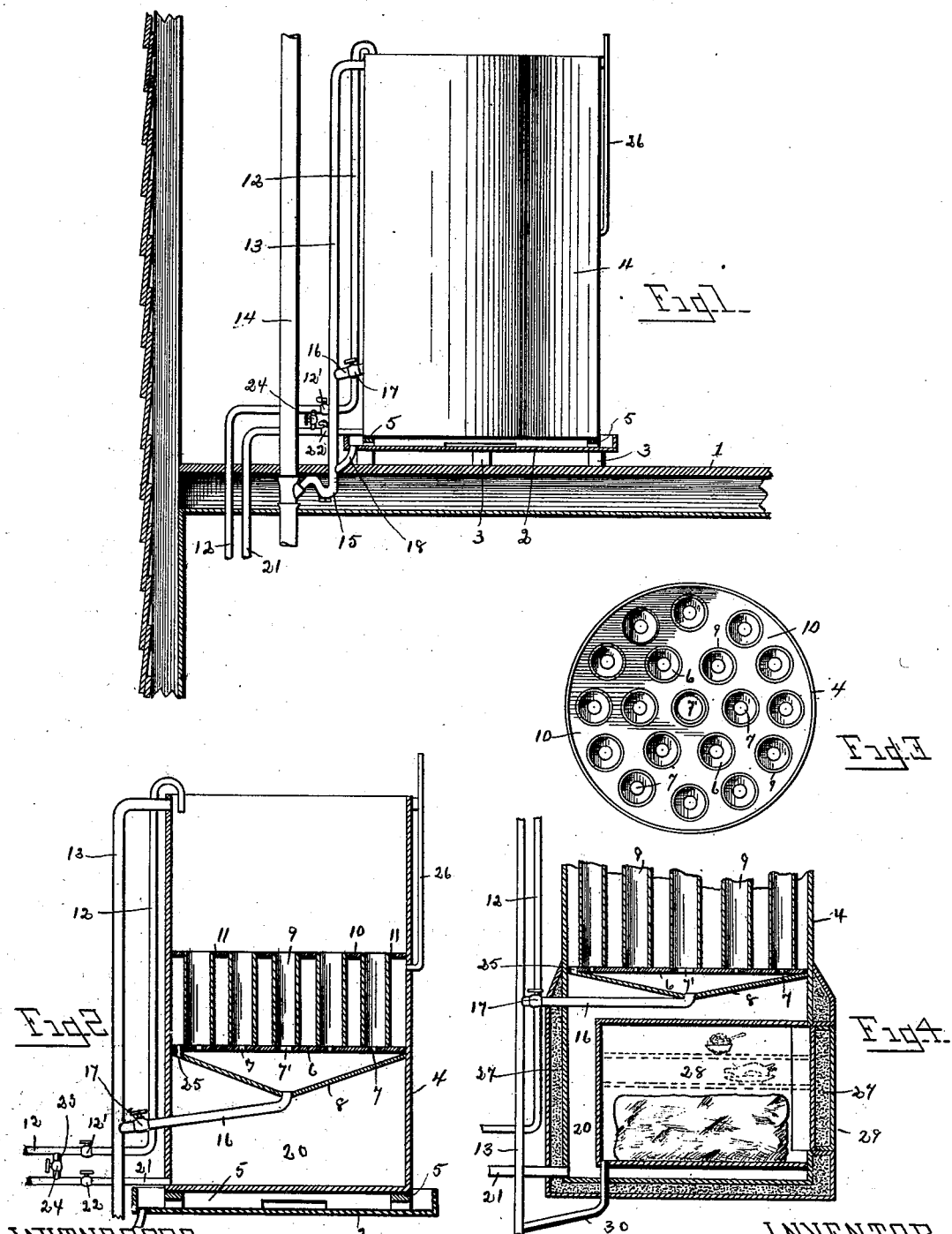
WITNESSES
Carroll J. Webster
Grace E. Lehanry
INVENTOR
John M. Skinner
By William Webster
Atty

United States Patent Office.

JOHN M. SKINNER, OF TOLEDO, OHIO.

FILTER.

SPECIFICATION forming part of Letters Patent No. 508,440, dated November 14, 1893.

Application filed April 18, 1892. Serial No. 429,689. (No model.)

*To all whom it may concern:*

Be it known that I, JOHN M. SKINNER, of Toledo, in the county of Lucas and State of Ohio, have invented certain new and useful Improvements in Filters; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to stationary filters, and has for its object to provide a filter capable of being erected in a building for the purpose of supplying an adequate amount of filtered water for drinking, or for drinking, cooking, and the lavatory, whereby there shall be at all times a supply of clear filtered water delivered to the pipes within the house equal to the demand for all purposes.

A further object is to provide convenient means for cleaning the filter, and carrying off the overflow and drip with an arrangement for permitting a flow of water through the pipes under full pressure, as in case of fire, or for cleaning the pipes, or for use temporarily while cleansing or repairing the filter.

The invention consists in the parts, and combination of parts hereinafter described and pointed out in the claims.

In the drawings: Figure 1 is a sectional view of a portion of a building, showing a portion of the floor upon which the filter rests, the filter case and pipes being shown in full lines. Fig. 2 is a longitudinal vertical sectional view of the filter and drip pan, the pipes being shown in full lines. Fig. 3 is a top plan view of the filter in position within the casing. Fig. 4 is a longitudinal vertical sectional view of the lower portion of the filter arranged as a cooler.

1 designates one of the floors of the building upon which is supported a pan 2 preferably upon sills 3 to raise the pan slightly above the floor.

Upon the bottom of pan 2 there is supported the filter casing 4, which is of slightly less diameter than the pan, and preferably slightly raised upon supports 5, so that access may be had if desired to remove any accumulation of débris from either the pan and floor, or the filter case and pan. Within the filter case is secured a transverse diaphragm 6 having a funnel shaped pan 8 secured to the casing immediately beneath the diaphragm.

9 designates filtering cylinders formed of a plastic material capable of being baked to hardness and rendered porous in the act of baking, after which they are arranged upon diaphragm 6, the end of a cylinder resting over each opening 7, which in order to avoid weakening the diaphragm are of less diameter than the bore of the cylinder, and are held in place by a suitable cement which seals the cylinder and diaphragm from the passage of water where joined. Upon the top of the filtering cylinders is a plate 10 formed with openings 11, which coincide with the bore of the cylinders and are of corresponding size, the cylinders and plate being cemented at the point of jointing to prevent the passage of water therethrough.

12 designates a pipe leading from the water supply and discharging into the filter case. 13 being an overflow pipe tapped into the filter case near the top and leading into the waste pipe 14, there being a trap 15 to prevent noxious gases from rising through the pipe.

16 designates a pipe connected with pan 8 and overflow pipe 13, there being a cock 17 in the pipe 16 by which to allow the withdrawal of any sedimentary deposit within the pan, when it is desired to wash the same, or to cut off the flow from the pan.

From drip pan 2, there is a pipe 18 connecting with pipe 13 whereby any water dripping into the pan 2 is carried off.

Below pan 8 there is a chamber 20 for filtered water provided with a pipe 21, which leads to the different points of delivery of the filtered water. This pipe is supplied with a cock 22, by which to control or entirely cut off the flow of water from chamber 20, and also when closed to prevent water from flowing into chamber 20 when water is being drawn through pipe 21 from pipe 12, which is accomplished by means of a pipe 23 connecting the two pipes, and provided with a cock 24. This arrangement is of great value when it is desired either to furnish a supply of water throughout the building under city pressure in case of fire, or for the purpose of cleaning the pipes of any sedimentary deposits that may have accumulated.

25 designates openings for the filtered water to pass through from the filtering chamber formed by diaphragm 6 and plate 10, the intermediate space between the plates and surrounding the cylinders receiving the water as it percolates through the cylinders.

26 designates a pipe tapped into the filtering chamber to prevent a vacuum in the same by the withdrawal of the filtered water.

From the foregoing description it will be seen that I have provided for a continuous supply of filtered water to all parts of the building, with provision for readily cleansing the filtering chamber, which is accomplished by simply revolving a brush in the cylinders by which means the accumulation upon the sides of the cylinders are removed, when by opening cock 17 and allowing water to flow through pipe 16 into the overflow pipe all matter removed from the cylinders is carried away by the overflow pipe.

In order to gain access to pipe 16 one of the openings 7' in the diaphragm immediately over pipe 16 is made the same diameter as the interior of the cylinder, whereby a person may remove any accumulation in the pan at this point by inserting the hand through the opening.

I have found that in some instances, as in the case of factories where a large number of persons are employed, or in large hotels, restaurants, or boarding houses, there is a demand for cold filtered water for drinking purposes only. I therefore to supply this demand construct the bottom or filtered water chamber as shown in Fig. 4 in which the sides are packed with a non-conducting filling 27, and in order to provide for a large area of cooling surface, and also to insulate the ice from contact with the water, I form an ice chamber 28 within the receptacle for filtered water, to which access is gained through a door 29 opening outwardly from the casing, the door being also packed with a non-conducting filling 27. This arrangement allows for cooling a large quantity of water in a short space of time, and therefore supplies all reasonable demands upon the filter with cold water.

In order to carry off the drip from the ice chamber, I tap a pipe 30 therein, and preferably lead the same to the waste pipe 13.

The arrangement of filter, or filter and cooler is such that when once erected, there is no attention needed in cleansing and operating except such as can be given by the ordinary help of the house in cleaning the cylinders, and in case of fire it is only necessary that the person having the filter in charge shall have been previously instructed to close cock 12' in pipe 12, and cock 22 in pipe 21, and open cock 24 in pipe 24, thereby allowing the water to flow through the pipes under city pressure.

In constructing ice chamber 28, there may be provided one or more shelves as shown in dotted lines Fig. 4 in order to utilize the same as a refrigerator, this feature being of great value in factories when the operatives desire to place certain perishable portions of their lunch therein for preservation.

I wish it understood that I may vary some of the details of construction widely without departing from the spirit of my invention, and that I may vary the number of cylinders at will. I may also if desired draw the filtered water directly from the filtering chamber instead of from a chamber beneath the same.

What I claim is—

1. In a filter, the combination with a casing of a filtering receptacle located within the same, and having a perforated bottom, a funnel shaped sediment pan arranged beneath the filtering receptacle, a water supply and an overflow pipe connected with the upper part of the casing, a discharge pipe attached to the apex of the sediment pan, and leading to the overflow pipe, and a tube passing through the sediment pan said tube leading from the filtering receptacle to the bottom part of the casing, and a draw off pipe for the filtered water, substantially as described.

2. In a filter, the combination with a casing of the upper and lower perforated plates the lower plate having a large central aperture, the open filtering cylinders between the plates, a funnel shaped sediment pan, and a pipe connected to the neck of the same directly beneath the central cylinder whereby said pipe may be cleaned from above, when choked.

In testimony that I claim the foregoing as my own I hereby affix my signature in presence of two witnesses.

JOHN M. SKINNER.

Witnesses:
WILLIAM WEBSTER,
HENRY HEGNER.